(12) United States Patent
Funato et al.

(10) Patent No.: US 7,570,295 B2
(45) Date of Patent: Aug. 4, 2009

(54) DIGITAL CAMERA

(75) Inventors: Kenichi Funato, Tokyo (JP); Kenji Kojima, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 576 days.

(21) Appl. No.: 11/206,023

(22) Filed: Aug. 18, 2005

(65) Prior Publication Data

US 2006/0038917 A1 Feb. 23, 2006

(30) Foreign Application Priority Data

Aug. 20, 2004 (JP) .............................. 2004-241165

(51) Int. Cl.
*H04N 5/222* (2006.01)
*H04N 5/225* (2006.01)
*H04N 5/232* (2006.01)

(52) U.S. Cl. ................ 348/333.06; 348/376; 348/211.7

(58) Field of Classification Search ................. 348/376, 348/333.06, 211.7; 345/8; 434/4
See application file for complete search history.

(56) References Cited

U.S. PATENT DOCUMENTS

| | | | | |
|---|---|---|---|---|
| 4,414,537 A | * | 11/1983 | Grimes | 341/20 |
| 5,097,252 A | * | 3/1992 | Harvill et al. | 340/540 |
| 5,486,112 A | * | 1/1996 | Troudet et al. | 434/250 |
| 5,832,296 A | * | 11/1998 | Wang et al. | 710/3 |
| 6,033,426 A | * | 3/2000 | Kaji | 606/213 |
| 6,115,482 A | * | 9/2000 | Sears et al. | 382/114 |
| 6,244,873 B1 | * | 6/2001 | Hill et al. | 434/236 |
| 6,346,929 B1 | * | 2/2002 | Fukushima et al. | 345/8 |
| 6,452,584 B1 | * | 9/2002 | Walker et al. | 345/158 |
| 6,744,420 B2 | * | 6/2004 | Mohri | 345/157 |
| 2003/0220542 A1 | * | 11/2003 | Belson et al. | 600/109 |
| 2005/0009584 A1 | * | 1/2005 | Park et al. | 455/575.6 |

FOREIGN PATENT DOCUMENTS

| JP | 07-248873 | * | 9/1995 |
|---|---|---|---|
| JP | 7-248873 A | | 9/1995 |
| JP | 2000-138858 | * | 5/2000 |
| JP | 2003-18443 A | | 1/2003 |

* cited by examiner

*Primary Examiner*—Lin Ye
*Assistant Examiner*—Euel K Cowan
(74) *Attorney, Agent, or Firm*—Birch, Stewart, Kolasch & Birch, LLP

(57) ABSTRACT

A digital camera comprising:
  a main unit with a display device attached to a palm or back of a hand;
  an image-pickup section attached to any one of fingers;
  a detection device which detects bending of a plurality of fingers; and
  a control section which changes an operating mode of the image-pickup section or display device according to the state of bending of the plurality of fingers detected by the detection device.

10 Claims, 5 Drawing Sheets

DIGITAL CAMERA

BACKGROUND OF THE INVENTION

1. Field of the Invention

The present invention relates to a digital camera, and more particularly, to a digital camera which can easily take pictures without holding the camera by hand to get ready for taking pictures.

2. Related Art

Digital cameras (electronic cameras) are becoming widespread rapidly in recent years. This digital camera as well as a conventional camera for a silver-salt film is designed to be held by hand to get ready for taking pictures.

However, the problem with such a camera is that a user always has to hold the camera by hand so as not to lose photo opportunities, and so at least one hand is not free, which is inconvenient. This also applies to a camera-equipped cellular phone which is being widely used in recent years.

Against this background, there is a proposal on a digital camera whose mechanism is attached to gloves, avoiding inconvenience when no picture is taken and at the same time allowing the user to immediately snap pictures without losing photo opportunities (see Japanese Patent Application Laid Open No. 2003-18443).

This proposal relates to a digital camera having a structure in which a camera lens is attached to the back of a glove, other mechanisms (battery, memory, etc.) are attached to other parts of the glove and a shutter switch is attached to a finger of the glove so as to operate the shutter switch by bending and stretching the finger.

SUMMARY OF THE INVENTION

Though such a digital camera is not obtrusive when no picture is taken and prevents losses of photo opportunities, a great disadvantage with such a camera is that it cannot make full use of various functions of a common digital camera.

That is, a common digital camera is furnished with a general image taking mode (single-exposure mode), continuous-exposure mode, movie mode (video), play mode, zoom mechanism, macro mechanism, etc., and these functions can be fully used by various operation sections. However, the digital camera disclosed in Japanese Patent Application Laid Open No. 2003-18443 can perform a level of operation not higher than just operating a shutter switch, which is not good enough as a digital camera.

The present invention has been implemented in view of such circumstances and it is an object of the present invention to provide a digital camera which is not obtrusive when no picture is taken, can immediately start to take pictures so as not to lose photo opportunities, allows a operating mode to be changed through operation by fingers and can make full use of various functions.

In order to attain the above described object, the present invention provides a digital camera furnished with a main unit with a display device attached to the palm or the back of the hand, an image-pickup section attached to any one of fingers, a detection device which detects bending of a plurality of fingers and a control section which changes an operating mode of the image-pickup section or display device according to the bending state of bending of the plurality of fingers detected by the detection device.

The present invention is a digital camera including a main unit, image-pickup section and control section that can be attached to a hand, providing excellent performance which is conventionally not available such as allowing an operating mode to be changed according to the bending states of a plurality of fingers, keeping the camera unobtrusive when no picture is taken, allowing an immediate start of image taking so as not to lose photo opportunities and making full use of various functions as the digital camera through finger operations.

Here, the display device of the "main unit with a display device" need not always be physically integrated with the main unit. For example, this may also include a state in which the main unit is attached to the back of the hand, the display device is attached to the palm, and both are connected by a signal cable.

The image-pickup section of the present invention is preferably attached to the finger and is provided with a substantially ring-shaped main unit placed at an end of a rod section which extends from the control section and a camera section provided in a manner freely movable around the substantially ring-shaped main unit. When the image-pickup section is rotatable around the finger in this way, image pickup is possible whether the back of the hand faces an object or the palm faces the object, which improves the function as the digital camera.

Furthermore, the detection device of the present invention is preferably made up of a plurality of myoelectric sensors. The use of such myoelectric sensors for the detection device allows bending of a plurality of fingers to be detected without constraining the operation of the fingers, which provides excellent operability for a photographer.

The present invention provides excellent performance which is conventionally not available such as keeping the camera unobtrusive when no picture is taken, allowing the user to immediately start to take pictures so as not to lose photo opportunities and making full use of various functions as the digital camera through finger operations.

DETAILED DESCRIPTION OF THE PREFERRED EMBODIMENTS

With reference now to the attached drawings, preferred embodiments of a digital camera according to the present invention will be explained in detail below.

Figure 1:
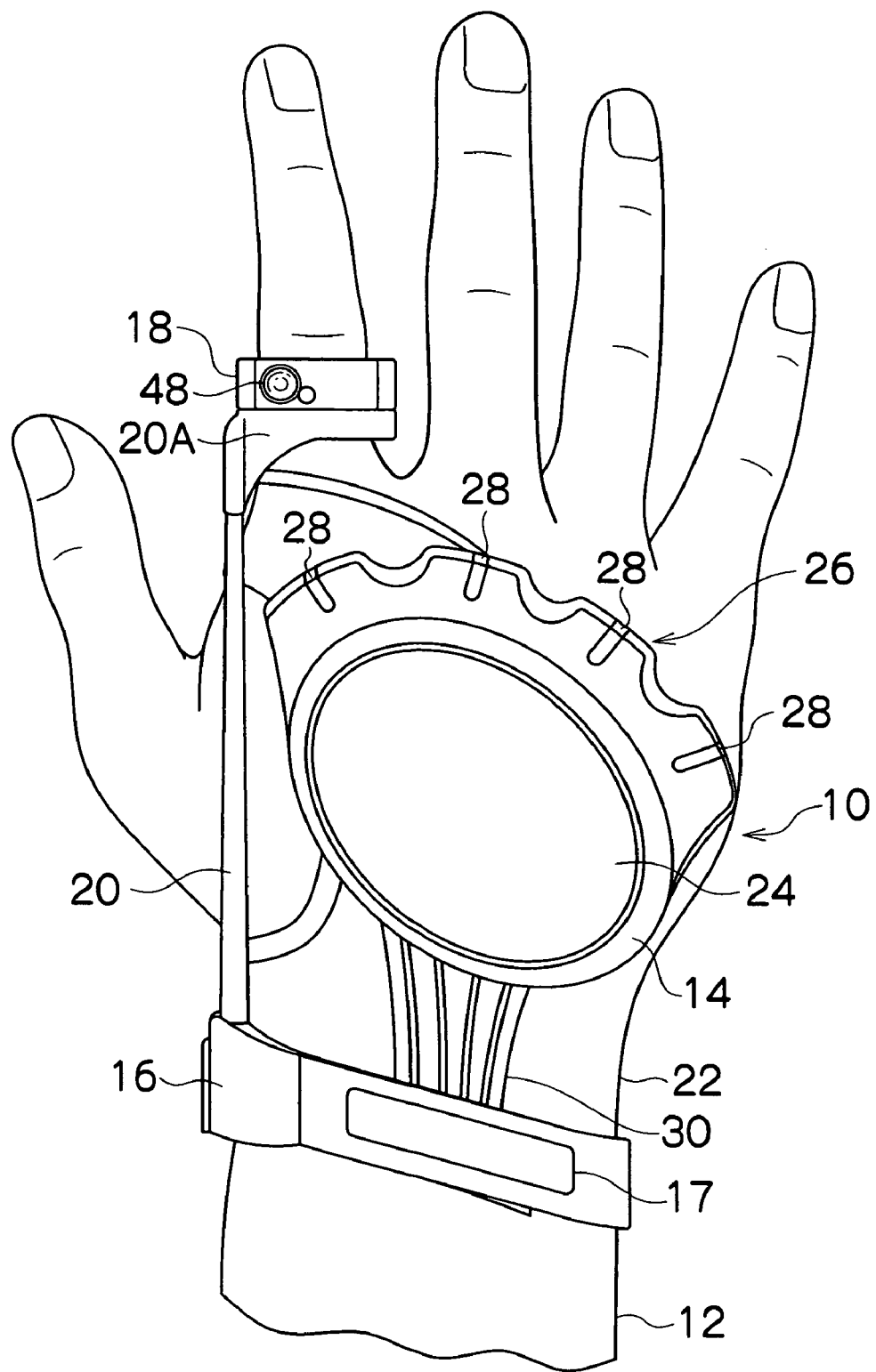
FIG. 1 is a front view of an appearance of a digital camera according to an embodiment of the present invention.

FIG. 1 is a front view of an appearance of the digital camera 10 according to the present invention. As shown in FIG. 1, the digital camera 10 is attached to one hand 12 for use. This digital camera 10 is made up of a main unit 14, a control section 16 which also serves as a wristband, an image-pickup section 18 attached to a finger and a rod section 20 which connects the control section 16 and the image-pickup section 18.

The main unit 14 is fixed to a finger-less glove 22 and attached to the back of the hand. An organic EL display 24 is provided in the center of the main unit 14 as a display device.

This organic EL display 24 functions as a viewfinder when taking pictures or functions as a display device (display) when reproducing pictures.

That is, the organic EL display 24 principally displays an image, displays an image (through video) taken by an image-taking lens 48 which will be described later so as to check the image to be taken before the image is actually taken, reads or reproduces and displays a recorded image from a memory card 64 (see FIG. 2) loaded in the digital camera 10.

A detection device 26 is provided at an upper edge of the main unit 14. This detection device 26 is made up of four myoelectric sensors 28, 28 . . . . The respective myoelectric sensors 28 are arranged so as to contact the roots of the forefinger, middle finger, ring finger and little finger to detect bending of the respective fingers. That is, the myoelectric sensors 28 are electrodes which detect myoelectric signals produced by movement of the muscle of the photographer and these myoelectric signals are sent to the control section 16.

The technology of detecting myoelectric signals observed from the skin surface of a human body and associating the myoelectric signals with movements of various parts of the body is a publicly known technology (Japanese Patent Application Laid Open No. 7-248873). An inner memory of a CPU 50 which will be described later prestores data which defines a relationship between myoelectric signals and movement of muscle, is assigned camera control commands for predetermined movements of fingers and stores data which defines the correlation.

Then, the CPU 50 controls the operation of the camera according to a command corresponding to the movements of the fingers of the photographer detected through the detection device 26.

The main unit 14 is connected to the control section 16 through a signal cable 30 led out of the lower edge.

The control section 16 which also serves as a wristband holds the rod section 20 upright. A ring section (finger ring) 20A is provided at an end of this rod section 20 and the ring-shaped (finger-ring-shaped) image-pickup section 18 is connected at the top of the ring section 20A in a rotatable manner. As shown in FIG. 1, this ring section 20A and image-pickup section 18 are attached to the forefinger for use.

In the state shown in FIG. 1, the image taking lens 48 of the image-pickup section 18 is directed frontward so that an image on the side of the back of the hand can be taken. On the other hand, when the image-pickup section 18 is rotated so that the image taking lens 48 faces the opposite side, an image on the palm side can be taken. Inside the image-pickup section 18, a CCD (image-pickup element) 52 (not shown in FIG. 1) is disposed at the image-forming position of the image taking lens 48.

The control section 16 is provided with a character display liquid crystal panel 17. The character display liquid crystal panel 17 displays information on the state of the camera and image-taking mode, etc., (so-called image-taking status) and displays, for example, a remaining amount of battery and the number of frames available for image taking.

The image-pickup section 18 and the control section 16 are connected together by a signal cable (not shown) disposed inside the hollow rod section 20.

Though not shown in FIG. 1, a memory slot for loading the memory card 64 as a recording medium is provided inside the control section 16. An image taken is recorded and saved as image data in this memory card 64 by a card reader/writer (see FIG. 2) 63 which is incorporated in the digital camera 10 and a recorded image can also be read from the memory card 64.

In this embodiment, for example, a smart media is used as the memory card 64, but a PC card, flash memory card, IC card, floppy disk, magneto-optical disk (MO), etc., can also be used as the recording medium.

Figure 2:
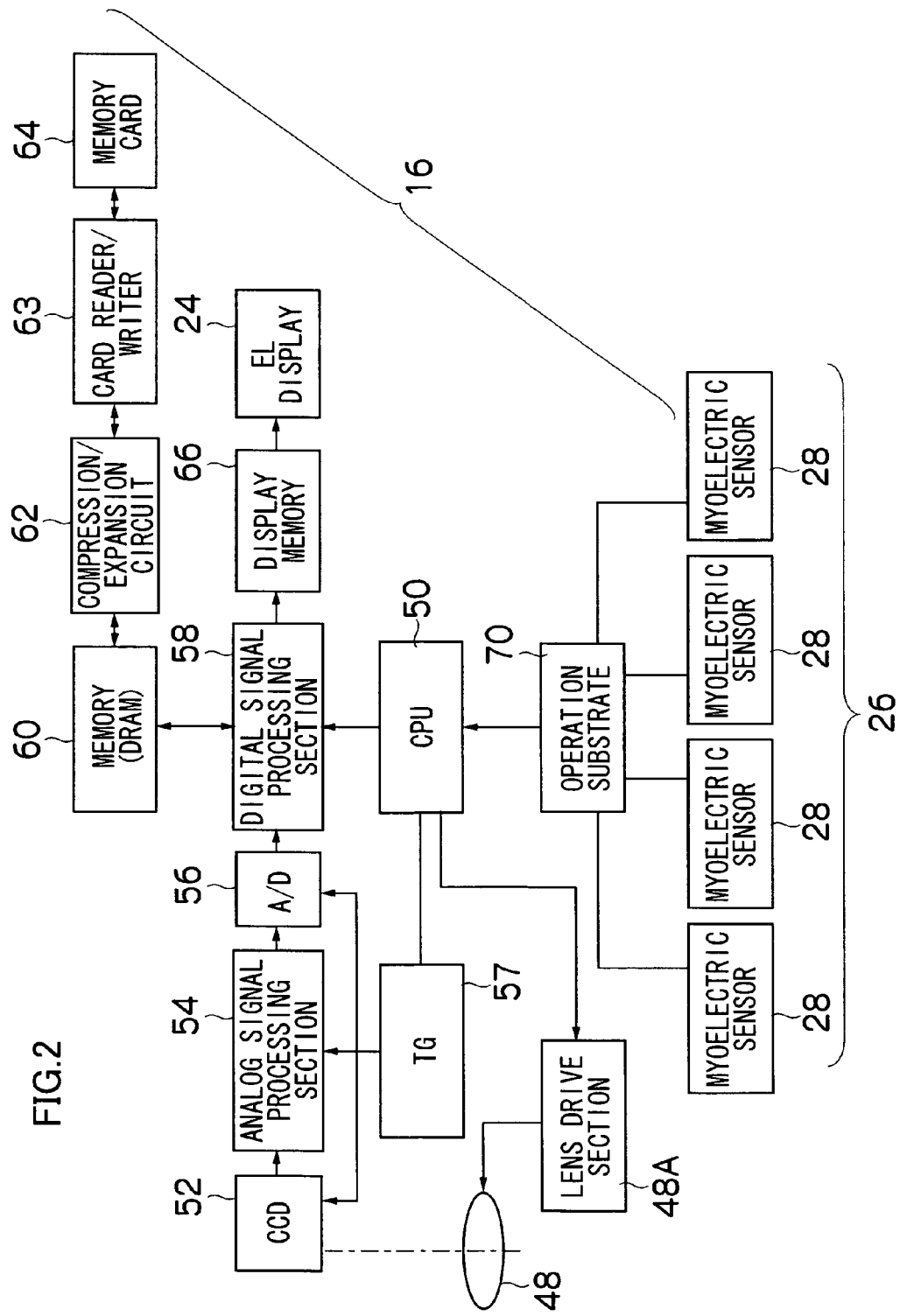
FIG. 2 is a block diagram showing the inner structure of the digital camera according to the embodiment of the present invention.

FIG. 2 is a block diagram showing the inner structure of the above described digital camera 10. The digital camera 10 is principally constructed of an operation substrate 70 making up a zooming magnification instruction device and a zoom center position instruction device, a central processing unit (CPU) 50, a CCD 52, an analog signal processing section 54, a digital signal processing section 58 making up a frame display device and an image-pickup device, a display memory 66 making up a display device, an organic EL display 24, a card reader/writer 63 and a memory card 64, etc.

The operation substrate 70 is connected to the various operation members shown in FIG. 1 in the circuit and outputs instruction signals to the CPU 50 based on signals of the detection device 26 according to the states of bending of a plurality of fingers of the photographer.

The CPU 50 outputs a control signal to the digital signal processing section 58 based on the inputs of instruction signals from the operation substrate 70 and controls the respective circuits in a concentrated manner. Furthermore, the CPU 50 controls a lens drive section 48A to drive the image taking lens 48 to carry out a zooming operation (by a zooming motor, etc.), focus control (by a focusing motor, etc.), etc.

The CCD (image-pickup element) 52 converts light of an object whose image is taken in and formed by the image taking lens 48 to signal charge in an amount corresponding to the amount of incident light. This signal charge is successively read from the CCD 52 as a voltage signal (image signal) and added to the analog signal processing section 54. The image-pickup element is not limited to this CCD and a CMOS image sensor, etc., can also be used.

The analog signal processing section 54 applies required analog processing such as sampling and white balance adjustment to the image signal added from the CCD 52. The analog signal processing section 54 also causes the A/D converter 56 to convert the image signal subjected to the analog processing to image data (digital data) and output the image data to the digital signal processing section 58. The CCD 52, analog signal processing section 54 and A/D converter 56 are operated synchronized with one another by a timing signal from the timing generator (TG) 57.

The digital signal processing section 58 applies digital processing such as gamma correction to the image data (image data of all pixel areas of CCD 52) input from the analog signal processing section 54 (A/D converter 56) as required and outputs this image data to the display memory 66 (memory 60).

Furthermore, when the CPU 50 inputs a control signal for controlling zooming magnification at the zoom center position to the digital signal processing section 58, the digital signal processing section 58 carries out digital zoom processing which extracts image data of zooming magnification centered on the zoom center position from the image data, generates an image corresponding to one screen and takes in this image as an image in the digital zoom area in addition to the aforementioned digital processing such as gamma correction.

Furthermore, the digital signal processing section 58, which makes up the frame display device, adds image data of an enlarged frame to the image data subjected to the digital zoom processing. This enlarged frame shows the size and position of the digital zoom area relative to the all pixel areas (or the entire area) based on the digital zoom area with respect to all the pixel areas (or entire area of the image recorded in the recording medium) captured by the CCD 52. The image data with the enlarged frame added is output to the display memory 66.

The memory card 64 records and saves the image data. Based on signals of the detection device 26 corresponding to the states of bending of a plurality of fingers of the photographer or when recording instructions are input through other switch operations, the CPU 50 outputs a control signal to the digital signal processing section 58, reads image data corresponding to one frame from the CCD 52, the digital signal processing section 58 applies the aforementioned digital processing or digital zoom processing and then this image data is written into the memory 60.

The enlarged frame is not added to the image data written into the memory 60. The image data written into the memory 60 is subjected to compression processing by a compression/expansion circuit 62 and recorded and saved in the memory card 64 by the card reader/writer 63.

The organic EL display 24 displays the image (through video) written in the display memory 66. When the mode is set to an image-taking mode and the display of the through video is turned ON based on signals of the detection device 26 according to the states of bending of a plurality of fingers by the photographer or through other switch operations, image data is successively loaded from the CCD 52 into the digital signal processing section 58, the image data is successively subjected to digital processing (digital zoom processing and addition of enlarged frame) by the digital signal processing section 58 and the image data is then written into the display memory 66. The image data of the display memory 66 is successively rewritten with newly loaded image data, which causes the organic EL display 24 to display the through video.

Furthermore, the organic EL display 24 can also display images recorded/saved in the memory card 64. When the mode is set to the play mode and any one piece of image data recorded in the memory card 64 is specified to be reproduced through a predetermined operation, the image data is loaded from the memory card 64 by the card reader/writer 63, subjected to expansion processing by the compression/expansion circuit 62, then subjected to digital processing by the digital signal processing section 58 and displayed on the organic EL display 24 through the display memory 66.

In the digital camera 10 having such a structure, the image data subjected to digital processing by the digital signal processing section 58 is displayed on the organic EL display 24 and the photographer can check the image of all pixel areas of the CCD on the organic EL display 24 (same size exposure). Furthermore, when the photographer performs zooming in/out operation, the digital signal processing section 58 performs digital zoom processing, image data with the enlarged frame added is displayed on the organic EL display 24 and the photographer can check the zoom center position of zooming magnification on the organic EL display 24 (digital zoom function).

Furthermore, the digital signal processing section 58 carries out digital processing on the image data recorded/saved in the memory card 64 and the photographer can check the image data recorded/saved in the memory card 64 on the organic EL display 24 (same size play). Furthermore, when the photographer performs zooming in/out operation at this time, digital zoom processing is performed and the image data with the enlarged frame added is displayed on the organic EL display 24 (play zoom function).

Though not shown in FIG. 1 and FIG. 2, the control section 16 is provided with various switches other than the above described detection device 26 and battery, etc. The detection device 26 is provided with four myoelectric sensors 28 and it is possible to change the operating mode by a combination of states of bending of a plurality of fingers as will be described later. However, since this combination alone is not sufficient, the control section 16 is provided with, for example, a power switch, white balance adjustment switch sensitivity (ISO) changeover switch, etc.

Figure 3:
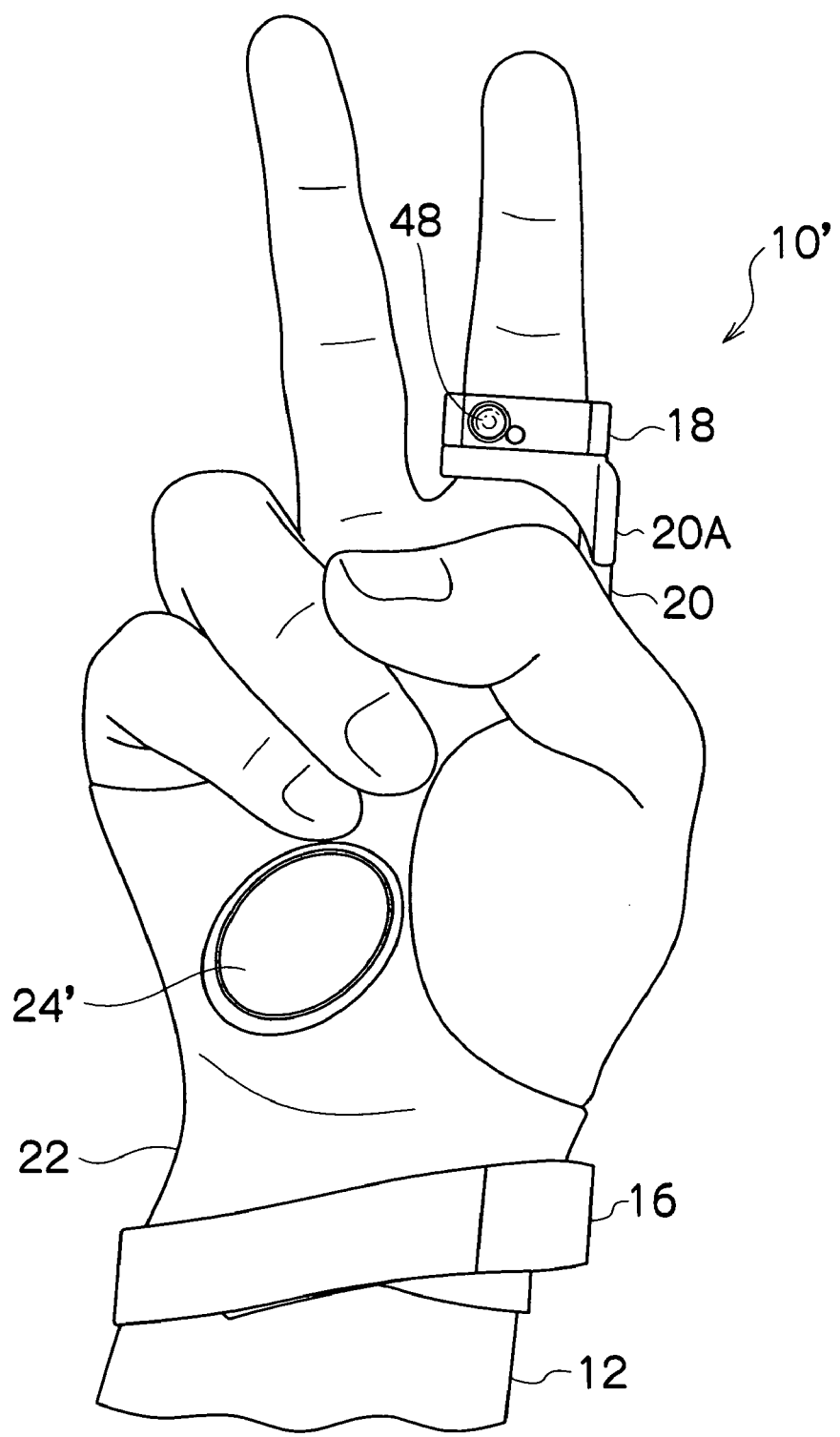
FIG. 3 is a front view of an appearance of a digital camera according to another embodiment of the present invention.

Next, another embodiment of the digital camera according to the present invention will be explained. FIG. 3 is a front view showing an appearance of a digital camera 10' according to the present invention. The same members as or similar to those of the digital camera 10 shown in FIG. 1 are assigned the same reference numerals and explanations thereof will be omitted.

What the digital camera 10' differs from the digital camera 10 shown in FIG. 1 is that the organic EL display 24 is fixed to the finger-less glove 22 and attached to the palm, not to the back of the hand. Adopting such a structure allows the photographer to take pictures with the palm directed frontward.

As in the case of the digital camera 10 shown in FIG. 1, the image-pickup section 18 is rotatable around the finger, and therefore pictures can be taken whether the back of the hand is directed to the object or the palm is directed to the object.

Furthermore, though not shown, the main unit 14 is fixed to the finger-less glove 22 and attached to the back of the hand as in the case of the digital camera 10 shown in FIG. 1 and it is possible to detect bending of fingers by the detection device 26.

Figure 4A:
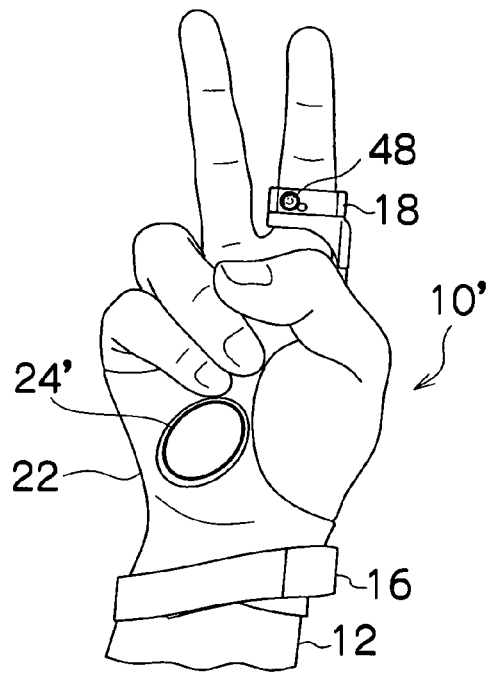
FIGS. 4A to 4D are front views of image-taking states in various modes.
Figure 4B:
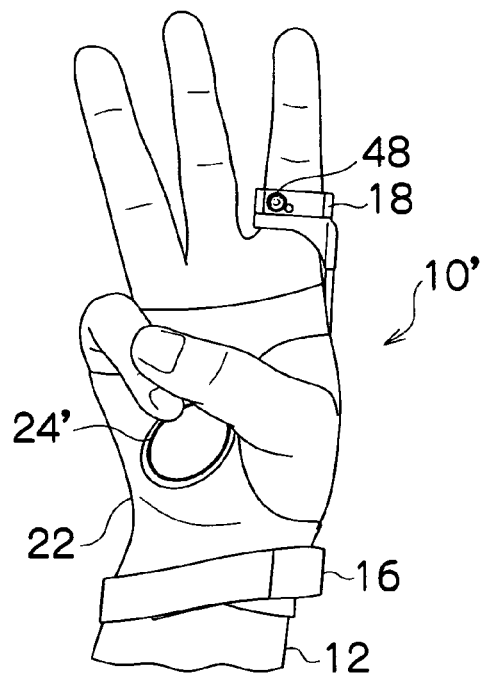
Figure 4C:
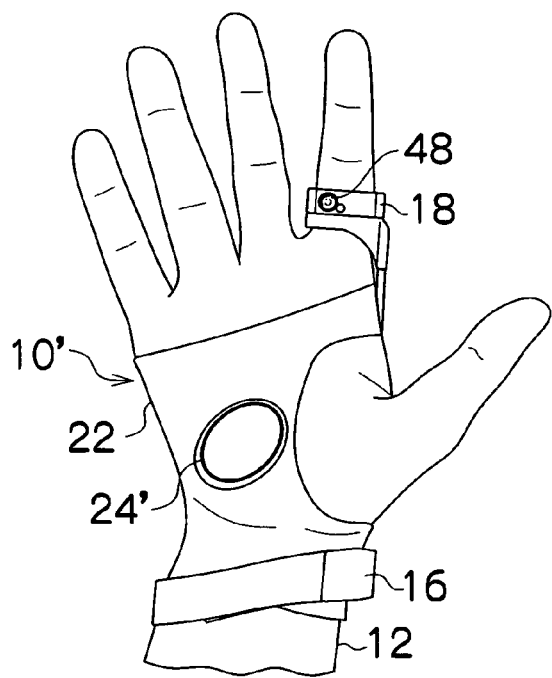

Next, the operation procedure of the digital camera 10, 10' having such a structure will be explained. First, the power switch, etc., is operated to put the camera in an image-taking standby status. When a photo opportunity appears, pictures are taken in various modes. FIGS. 4A to C show image-taking states in various modes. Of these states, FIG. 4A shows a finger state in which the forefinger and middle finger are stretched, while the thumb, ring finger and little finger are bent and when this finger state is set, a single-exposure (one picture is taken) is performed.

FIG. 4B shows a finger state in which the forefinger, middle finger and ring finger are stretched, while the thumb and little finger are bent and when this finger state is set, a continuous-exposure (a plurality of pictures are taken) is performed.

FIG. 4C shows a finger state in which all five fingers are stretched and when this finger state is set, movie taking (motion picture taking) is performed.

Figure 4D:
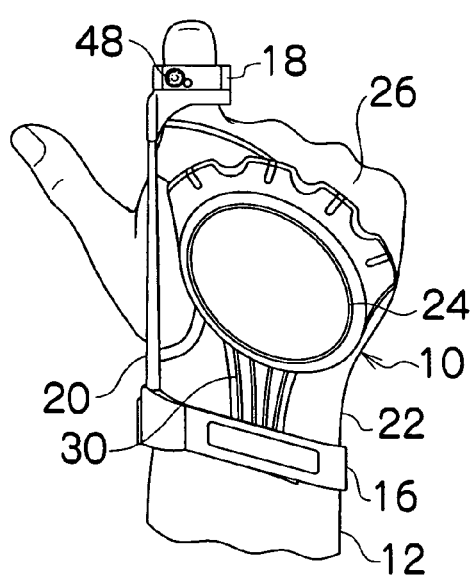

Next, the operation procedure of the digital camera 10 in a play mode will be explained. First, a play mode is set by operating the power switch, etc., of the control section 16. Then, a recorded image is displayed on the organic EL display 24. FIG. 4D shows a frame advance state in this play mode. That is, this is a finger state in which the thumb is stretched, while the forefinger, middle finger, ring finger and little finger are bent. When this finger state is set, frame advances are made in the play mode.

The finger states shown in FIGS. 4A to 4D above are only examples and it is also possible to change the mode corresponding to the finger state according to the frequency of use. In this case, the various switches of the control section 16 are operated while checking the display of the character display liquid crystal panel 17.

Figure 5:
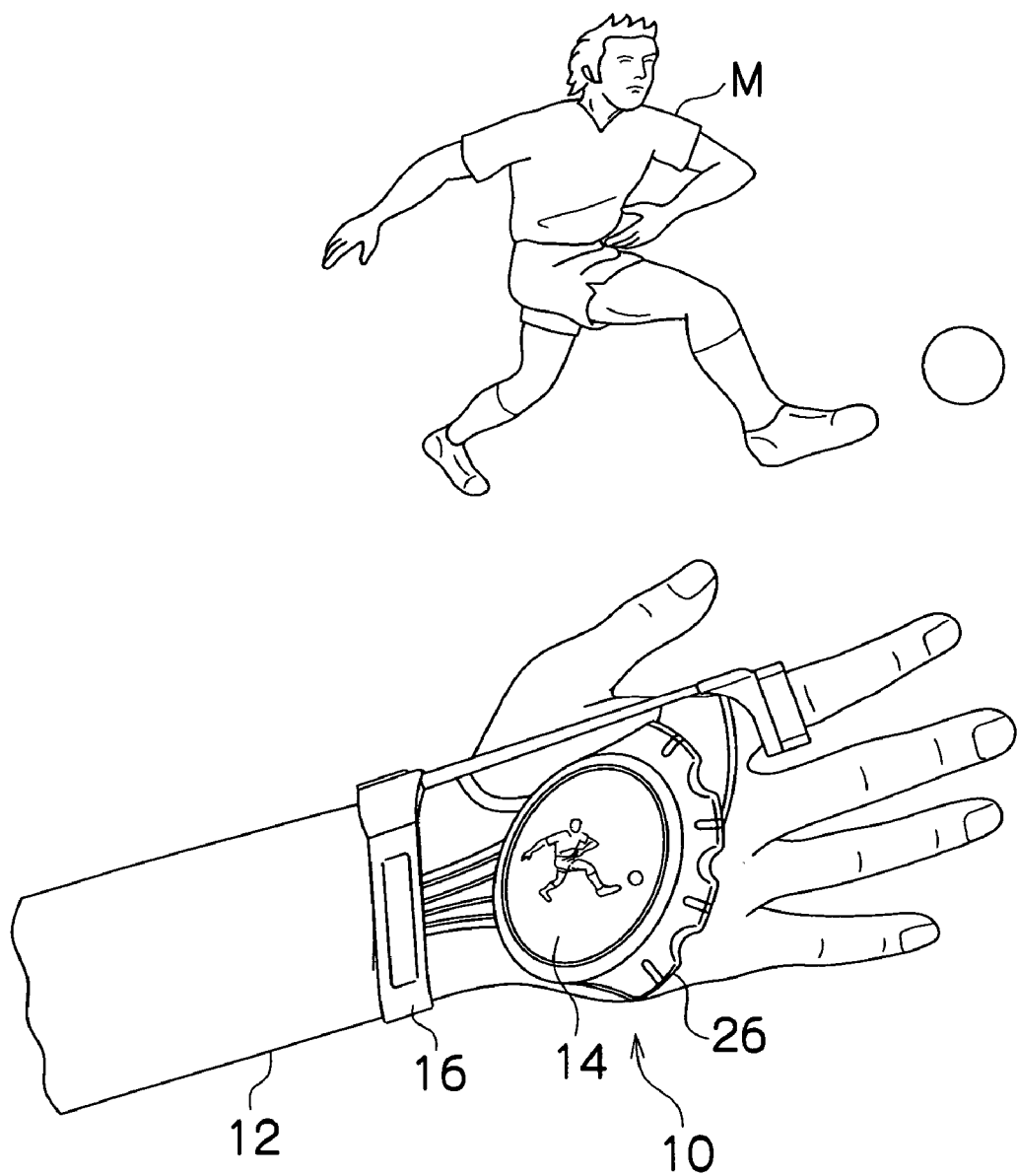
FIG. 5 is a schematic view assuming a state in which the digital camera of the present invention is used.

FIG. 5 is a schematic view assuming a state in which the digital camera 10 according to the present invention is used. In this figure, a video image of another player during a sport is taken in a moving image state. Thus, according to the digital camera 10 of the present invention, it is possible to easily perform picture taking by a player himself/herself or mutual picture taking among the players during a sport. Therefore, it is possible to easily take picture in a state in which it is not possible to hold the camera by hand to get ready for taking pictures outdoors, etc.

As explained above, the digital camera according to the present invention frees the photographer from a conventional style of holding the camera by hand to get ready for taking pictures and allows the photographer to easily take pictures in a state in which the photographer cannot hold the camera by hand. Furthermore, pictures can be taken or reproduced by detecting a sign of the fingers, the sign can also serve as a sign of picture taking. Furthermore, a wearable camera unit is provided, which also contributes to an expansion of communication elements accompanied by a body language.

The embodiments of the digital camera according to the present invention have been explained so far, but the present invention is not limited to the above described embodiments and can be implemented in various modes.

For example, four myoelectric sensors 28 are used as the detection device 26 of this embodiment, but other structures can also be used. An example of this structure is one in which an all-finger glove or half-finger glove is used instead of the finger-less glove 22 and a distortion gauge is placed at the root of the back of each finger. According to this structure, the root of the back of each finger of the glove stretches/bends in response to stretching/bending of the finger and the resistance of each distortion gauge changes accordingly. Therefore, it is possible to make full use of the function as a switch by detecting this change in the resistance.

Furthermore, this embodiment is also provided with an optical zoom mechanism, etc., as in the case of the conventional digital camera, but it is also possible to limit the camera to a structure in which a minimum necessary function can be displayed in order to enhance the aspect as a wearable camera unit.

This embodiment has adopted the reflection type organic EL display 24 as the display device, but it is also possible to adopt elements of other types such as a plane display, for example, liquid crystal display element.

All the explanations above have described examples of a digital camera, but similar effects can also be obtained in devices with a built-in image-taking function such as cellular phone and PDA.

What is claimed is:

1. A digital camera comprising:
a main unit with a display device attached to a palm or back of a hand;
an image-pickup section attached to any one of fingers;
a detection device which detects bending of a plurality of fingers, wherein the detection device includes a plurality of sensors arranged so as to contact at least a plurality of fingers; and
a control section which changes an operating mode of the image-pickup section or display device according to the state of bending of the plurality of fingers detected by the detection device, wherein the image-pickup section comprises a substantially ring-shaped main unit which is attached to the finger and provided at an end of a rod section which extends from the control section and a camera section provided in a manner freely movable around the substantially ring-shaped main unit.

2. A digital camera comprising:
a main unit with a display device attached to a palm or back of a hand;
an image-pickup section attached to any one of fingers;
a detection device which detects bending of a plurality of fingers, wherein the detection device includes a plurality of sensors arranged so as to contact at least a plurality of fingers; and
a control section which changes an operating mode of the image-pickup section or display device according to the state of bending of the plurality of fingers detected by the detection device, wherein the image-pickup section comprises a circular main unit which a finger is placed inside the circular main unit, where the circular main unit is provided at an end of a rod section which extends from the control section and the circular main unit includes a camera section, wherein the circular main unit including the camera section is rotatable around the finger.

3. The digital camera according to claim 1, wherein the detection device comprises a plurality of myoelectric sensors.

4. The digital camera according to claim 2, wherein the detection device comprises a plurality of myoelectric sensors.

5. The digital camera according to claim 2, wherein the myoelectric sensors are arranged so as to contact the roots of at least the plurality of fingers.

6. A digital camera comprising:
a main unit with a display device attached to a palm or back of a hand;
an image-pickup section attached to any one of fingers;
a detection device which detects bending of a plurality of fingers; and
a control section which changes an operating mode of the image-pickup section or display device according to the state of bending of the plurality of fingers detected by the detection device,
wherein the image-pickup section comprises a circular main unit which a finger is placed inside the circular main unit, where the circular main unit is provided at an end of a rod section which extends from the control section and the circular main unit includes a camera section, wherein the circular main unit including the camera section is rotatable around the finger.

7. The digital camera according to claim 6, wherein the detection device includes a plurality of myoelectric sensors arranged so as to contact at least a plurality of fingers, wherein the plurality of myoelectric sensors detect bending of at least one finger and outputs instruction signals based on corresponding states of the bending of at least the one finger.

8. The digital camera according to claim 7, wherein based the instruction signals corresponding to the states of bending of the at least one finger, the control section controls a zooming or focusing function of the camera based on a first state of bending of the at least one finger and captures a picture based on a second state of bending of the at least one finger.

9. The digital camera according to claim 8, wherein based the instruction signals corresponding to the states of bending of the at least one finger, the control section takes a plurality of pictures based on a third state of bending of the at least one finger.

10. The digital camera according to claim 9, wherein based the instruction signals corresponding to the states of bending of the at least one finger, the control section performs movie taking operation based on a fourth state of bending of the at least one finger.

* * * * *